United States Patent [19]

Derman

[11] Patent Number: 4,655,057

[45] Date of Patent: Apr. 7, 1987

[54] SECURITY DEVICE FOR A VIDEO CASSETTE RECORDER OR THE LIKE

[75] Inventor: Jay S. Derman, Redondo Beach, Calif.

[73] Assignee: Z-Lock Corporation, Redondo Beach, Calif.

[21] Appl. No.: 698,312

[22] Filed: Feb. 5, 1985

[51] Int. Cl.⁴ .............................................. B65D 55/14
[52] U.S. Cl. ............................................ 70/14; 70/58; 70/63; 70/167; 70/168; 360/137
[58] Field of Search ................. 70/168, 166, 258, 167, 70/57, 163, 58, 169–173, 14, 63; 360/137; 455/345; 369/77.1, 292

[56] References Cited

U.S. PATENT DOCUMENTS

| 2,014,112 | 9/1935 | McCord | 70/168 |
| 4,311,883 | 1/1982 | Kidney | 70/57 X |
| 4,527,405 | 7/1985 | Renick et al. | 70/14 |
| 4,527,407 | 7/1985 | Shanklin | 70/167 |

FOREIGN PATENT DOCUMENTS

| 149101 | 11/1952 | Australia | 70/168 |
| 605259 | 9/1960 | Canada | 70/168 |
| 1358432 | 3/1964 | France | 70/168 |
| 8105741 | 7/1983 | Netherlands | 70/57 |
| 667588 | 3/1952 | United Kingdom | 70/168 |
| 2131219 | 6/1984 | United Kingdom | 70/57 |

Primary Examiner—Robert L. Wolfe
Assistant Examiner—Lloyd A. Gall
Attorney, Agent, or Firm—Poms, Smith, Lande & Rose

[57] ABSTRACT

A deterrent device for inhibiting unauthorized use and sale of a video cassette recorder having a cassette chamber provided with a chamber opening and a hinged door normally closing said chamber opening in which the device includes a front panel to cover the opening, inwardly projecting members carried on the panel and extending through the chamber opening into the interior of the cassette chamber for moving the door into a position for engagement by said inwardly projecting arms to restrict and prohibit outward movement of the device, and an unlock element carried by the front panel and positioned within the chamber for movement against the door to lift the door from its engagement with the inwardly projecting arms for permitting release and removal of the device from said chamber and opening.

7 Claims, 7 Drawing Figures

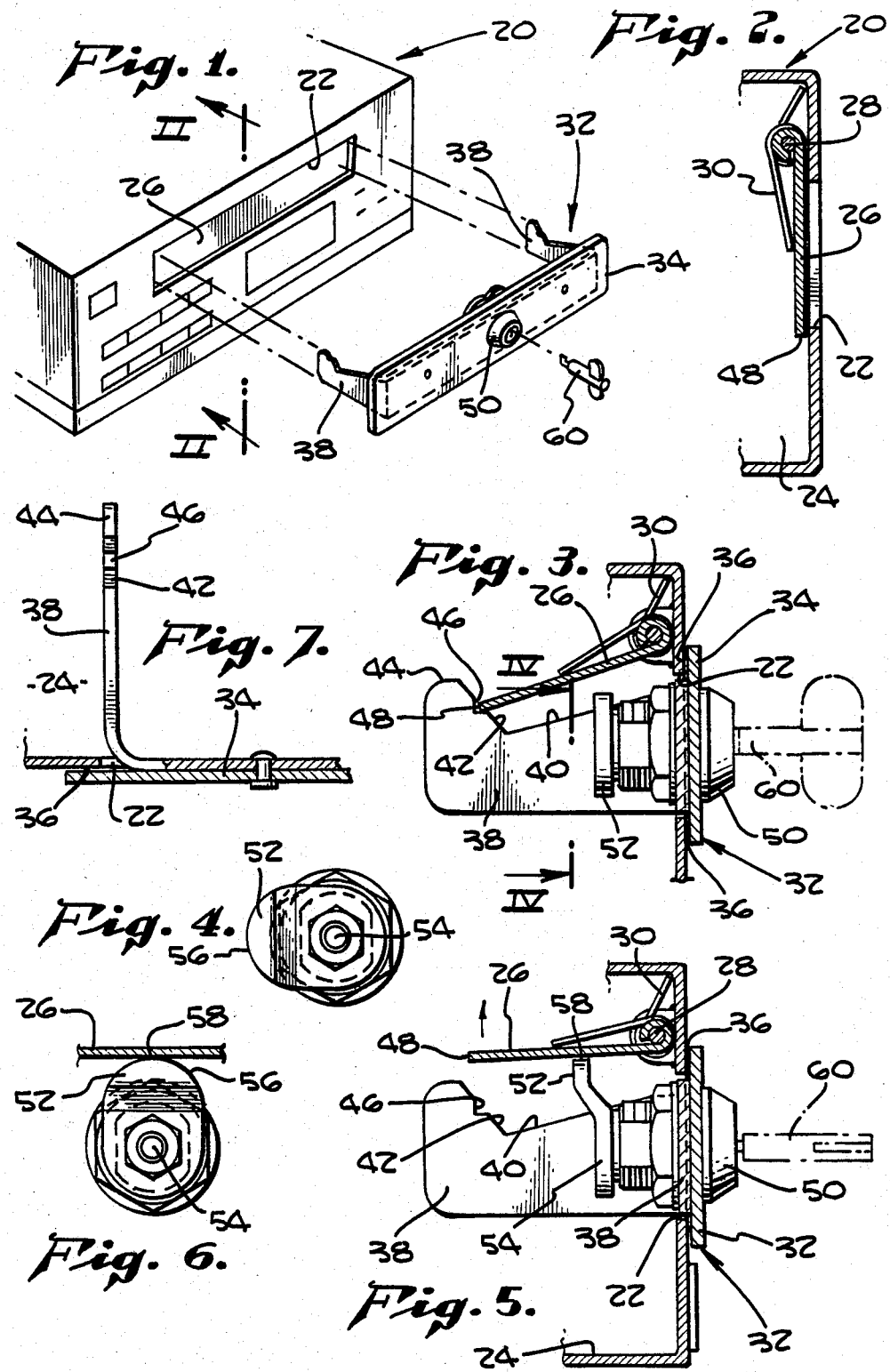

SECURITY DEVICE FOR A VIDEO CASSETTE RECORDER OR THE LIKE

BACKGROUND OF THE INVENTION

Video cassette recorders, including both VHS type and BETA type, have become very popular for use in the home and for use in commercial, industrial and professional applications. A video cassette recorder is readily operable to provide both video and audio renditions by simply inserting a video cassette into a cassette-receiving chamber in the recorder. Such cassette chambers are provided with an opening which is normally closed by a door hinged about one edge to permit facile insertion of the cassette tape. The purpose of the door is normally to prevent the introduction into the cassette chamber of unwanted objects which might interfere with the proper operation of the cassette when the cassette is in the cassette chamber—such objects including dust, dirt, and small objects which might be inadvertently inserted by a child, etc.

Use of the video cassette recorder is often abused. Video cassettes may be procured which depict many forms of violence and R-rated subjects which are not suitable for viewing by nonadults. Further, video cassette recorders are readily portable, susceptible to being stolen, and readily sold on the black market or in a "flea market".

SUMMARY OF THE INVENTION

The principal purpose of the present invention is to provide a simple security device which prevents unauthorized access to the video cassette chamber, unauthorized use of the video cassette recorder in the absence of the owner or an authorized person, and which serves as a deterrent to theft because removal of the security device of this invention without its unlocking means will cause undesirable damage to the cassette recorder and thus restrict its marketability.

The object of the present invention is to provide a security device of simple and novel construction which prevents access to the video cassette chamber in a video cassette recorder.

Another object of the invention is to provide a security device which is inserted into the video cassette chamber of a video cassette recorder and is automatically locked therein to prevent insertion of an unwanted cassette or other object into the cassette chamber.

A further object of the invention is to provide a security device for a video cassette recorder which restricts use of a video cassette recorder and which is readily removed and released from the video cassette recorder by actuation of an unlock means.

A still further object of the present invention is to provide a security device for a video cassette recorder which is adaptable to different types of doors found at the cassette chamber opening of different makes and models of video cassette recorders.

The invention particularly contemplates a security device for a video cassette recorder in which the cassette recorder has a cassette-receiving chamber provided with a chamber opening and a hinged door for the chamber in which a front panel closes the chamber opening and has edge margins adapted to seat against edge margins defining the chamber opening which restricts inward movement of the security device, inwardly projecting engagement members on said front panel which extend into the chamber and have notch means cooperable with the edge of the door when it is hinged into partially open position for restricting outward movement and removal of the security device, and unlock means carried by the front panel and having a lock element within the chamber. The lock element when actuated by a key is adapted to lift the door out of engagement with the engagement members to allow removal of the security device. Without the key for the unlock means, the security device is not removable from the video cassette recorder unless some damage is done to the internal parts of the cassette chamber, and such prospective damage to the recorder acts as a deterrent to theft of the video recorder.

Many other objects and advantages of the present invention will be readily apparent from the following description of the drawings in which an exemplary embodiment of the invention is shown.

IN THE DRAWINGS

FIG. 1 is a fragmentary perspective view of a video recorder having a cassette receiving opening and in exploded relation thereto, a security device embodying this invention.

FIG. 2 is a fragmentary sectional view taken in a vertical plane indicated by the line II—II of FIG. 1, and with the security device removed.

FIG. 3 is a fragmentary sectional view taken in the same plane as FIG. 2 showing the security device inserted in the video recorder and in locked position therewithin.

FIG. 4 is a view of the unlock element taken from the plane indicated by line IV—IV of FIG. 3.

FIG. 5 is a fragmentary view taken in the same plane as FIG. 2, and showing actuation of the unlocking device to raise the door of the video cassette chamber opening to permit removal of the security device.

FIG. 6 is a view similar to FIG. 4, showing the unlock element in unlocking actuated position.

FIG. 7 is a fragmentary sectional view showing a corner of the security device at the left side thereof extending into the cassette receiving chamber.

DETAILED DESCRIPTION

Referring first to FIG. 1, a video cassette recorder is generally indicated at 20. Recorder 20 may be any one of a number of video recorders presently made and manufactured and sold in the market place. Video cassette recorders are generally of two types, namely a VHS format or type, or a BETA format or type. In each type of video cassette recording, one of the walls of the recorder is provided with an opening 22, through which a video tape may be inserted into a cassette-receiving chamber, generally indicated at 24 in FIG. 2. Within the chamber 24 are provided means for receiving and positioning a video cassette and providing the necessary engagement with the tape heads for playing of the video cassette. Such details are not shown, because they do not form any part of this invention.

The opening 22 in the recorder 20, in this example, is provided with a door 26 hinged about a horizontal axis 28, and normally biased into closed position by a suitable spring means 30. Other types of doors may be provided (which are not shown), one such other type being a door which is hinged about both top and bottom edges and split in the middle so that both upper and lower halves of the door will be normally biased into closed position. As indicated above, the purpose of the door is to prevent introduction of foreign objects and articles, such as dust or small items which might inadvertently be placed into the cassette chamber by a child. Often, the door 26 may be automatically opened upon pressing of an eject button provided on the recorder to remove a cassette.

The security device 32 of this invention comprises a front elongated rectangular panel 34 having a configuration corresponding to the opening 22, and dimensionally slightly larger, so that inner marginal surfaces of the panel 34 will overlie outer marginal surfaces of the opening 22 as at 36 to limit inward movement of the security device 32. Projecting inwardly, adjacent to each end of panel 34 and at right angles thereto, are engagement members or arms 38. Arms 38 are spaced apart to be conveniently received within the opening 22, and yet limit excessive lateral play of the security device 32 in the opening 22. Each arm 38 includes an upper edge portion 40 which slopes downwardly from the front panel 34, and then includes an upwardly sloping portion 42 which terminates at a top portion 44, having a height dimensionally slightly less than the height of opening 22. The upwardly sloping edge portion 42 in this example is shown at approximately 45 degrees and includes a central notch 46 having a vertical back edge and a horizontal bottom edge. The location of notch 46 on each arm 38 is at a distance from the surfaces interengagement at 36 such that the bottom edge 48 of the door 26 will be received in notch 46 when the security device is fully inserted into the opening 22.

Thus, when the security device is inserted into opening 22, the inner ends of arms 38 will push against the biased door 26, causing it to be hinged upwardly upon its hinge axis 28, and as the security device reaches its innermost position, the edge 48 of the door 26 will ride along the top edge of portion 44 of each arm and move downwardly for reception in notch 46. It would thus be apparent that removal of the security device by attempting to pull the device outwardly from the opening will be resisted and prevented by abutment of edge 48 of the door against the vertical edges of the notches 46.

In the example of the configuration of each arm 38 shown in the drawings, it will be understood that the slope of the edge portions 40 and 42 may be changed and varied to provide different configurations of the arms 38. Also, the upwardly inclined edge portions 42 may be of different inclination, and such edge portion may be provided with a plurality of notches such as 46 in order to accommodate different heights of doors 26. It will be understood that the door opening in the video cassette recorders are of generally standard height and width, because of the standardization of the size of the video cassettes. In a door having upper and lower pivoted panels, it will be understood that to engage a door of half the width of the exemplary door 26, that the notch 46 must be moved forwardly on the edge portion of the arms 38, so that there will be interlocking engagement of arms 38 with the edge of such a half door.

Unlock means generally indicated at 50, may be provided at the center of the panel 34; such unlock means may include a cylindrical form of lock, which extends inwardly between the two arms 38 a sufficient distance, as indicated in FIG. 3, to mount a unlock element 52, adapted to be pivoted about the axis 54 of the unlock means 50. Unlock element 52 includes a convex edge portion 56 positioned a sufficient distance from the axis 54 to engage and lift door 26 as indicated at 58, FIG. 5.

Such lifting of door 26 against the bias of the spring means 30 disengages edge 48 from notch 46 and permits the security device 32 to be withdrawn outwardly from the cassette chamber 24. In such withdrawal and after the edge 48 has passed over the top edge portion 44 of the arms 38, the unlock element 52 may be turned about its axis to its normal inoperative position as shown in FIG. 4, so as to permit and facilitate withdrawal of the security device 32 from the video recorder.

The unlock means 50 may include a cylindrical type of key which facilitates engagement of the lock parts to cause rotation of the unlock element about the axis of the cylindrical lock.

The security device 32, when inserted and automatically locked as shown in FIG. 3, has very limited play in an in-and-out direction, in a lateral direction, and in an up-and-down direction. Without a key to lift the door from its locking engagement with the notch 46, any attempts to remove the security device may easily result in damage and disfiguration of the outer walls of the video recorder, as well as internal parts of the video recorder within the cassette receiving chamber, and particularly the door 26. The presence of the security device of this invention in a video recorder is believed to act as a deterrent to theft of the video recorder, and its saleability in the market place for stolen articles. The security device is readily inserted into the cassette receiving chamber, and is automatically locked therein.

Various changes and modifications may be made in the construction and mode of operation of a security device described above, and which may fall within the spirit of this invention, and also changes and modifications coming within the scope of the appended claims are embraced thereby.

I claim:

1. In combination with a video cassette recorder or the like in which the cassette recorder has a cassette-receiving chamber provided with a chamber opening and a hinged door therefor, a security device comprising:
    means for closing said opening to prevent unauthorized access to the cassette chamber, including:
    a front panel having edge margins seated against edge margins defining said chamber opening,
    inwardly projecting engagement members on said panel extending into said chamber,
    said engagement members having means cooperable with said door upon insertion of said engagement members into said chamber for locking against outward movement and removal of the closing means,
    and unlock means carried by said panel and having an unlock element positioned within the cassette chamber,
    said unlock element moving the door out of engagement with the engagement members to allow removal of the closing means.

2. A security device as claimed in claim 1, including means carried by said panel for moving the unlock element to release the closing means.

3. A device as claimed in claim 1 wherein said engagement members include,
    one or more forwardly facing notches for reception of inner door edges.

4. A device as claimed in claim 1 wherein,
    said engagement members are spaced approximately the width of a door opening to limit lateral movement of the closing means.

5. A device as claimed in claim 1 wherein,
said door is biased to closed position,
and said lock element upon rotation thereof, engages and moves said biased door to cause disengagement thereof with said engagement members.

6. Means to secure and prevent unauthorized use of a chamber having an opening adapted to receive a removable object, said chamber opening having a hinged door normally in closed position to restrict passage of unwanted objects, comprising, in combination therewith:
means for covering the door opening;
means for moving the door inwardly about its hinge axis to at least a partial open position and for locking engagement with edge margins of the door in said partial open position to inhibit movement of the covering means relative to the door opening;
and means for additionally moving the door about its hinge axis for releasing the door from said locking engagement to uncover the opening and to provide access to the chamber opening,
said means for releasing said locking engagement including an unlock element moveable by a key to lift and disengage the door from said door moving and engagement means.

7. A deterrent device for inhibiting unauthorized use and sale of a video cassette recorder having a cassette chamber provided with a chamber opening and a hinged door diased in one direction and normally closing said chamber opening; comprising in combination therewith:
a front panel means adapted to cover said opening and having inward movement thereof limited by seating engagement of said panel means against edge marginal surfaces of said chamber opening;
inwardly projecting means carried by said panel means, extending through said chamber opening and into the interior of said cassette chamber;
said inwardly projecting means including means for moving said door in a direction opposite to said one biased direction and means engageable with said door for restricting and prohibiting outward movement of said panel means;
and unlocking means carried by said front panel means and extending into said chamber for release of said door from said means restricting and prohibiting outward movement of said panel means,
said unlocking means including a cylindrical lock and an unlock element adapted to be moved by a cylindrical key into lifting engagement with said door for releasing said means engageable with said door to release said deterrent device.

* * * * *